United States Patent [19]

Okazaki et al.

[11] Patent Number: 5,413,769
[45] Date of Patent: May 9, 1995

[54] CLAD FINE WIRE ELECTRODE-TYPE ACTIVATED SPECIES-GENERATING APPARATUS

[75] Inventors: Sachiko Okazaki, Tokyo; Masuhiro Kogoma, Wakou; Masahiro Hirakawa, Ibaraki; Kazuo Kasai, Suita, all of Japan

[73] Assignee: Sumitomo Precision Products Co., Ltd., Amagasaki, Japan

[21] Appl. No.: 853,743

[22] PCT Filed: Oct. 14, 1991

[86] PCT No.: PCT/JP91/01396
§ 371 Date: Aug. 4, 1992
§ 102(e) Date: Aug. 4, 1992

[87] PCT Pub. No.: WO92/06917
PCT Pub. Date: Apr. 30, 1992

[30] Foreign Application Priority Data

Oct. 17, 1990 [JP] Japan ............... 2-279621

[51] Int. Cl.$^6$ ............... B01J 19/12; C01B 13/11
[52] U.S. Cl. ............... 422/186.07; 422/186
[58] Field of Search ........... 422/186.07, 186, 186.08, 422/186.09, 186.1, 186.11, 186.12, 186.13, 186.14, 186.15, 186.16, 186.04; 204/176

[56] References Cited

U.S. PATENT DOCUMENTS

| | | | |
|---|---|---|---|
| 945,917 | 1/1910 | Cottrell | 422/186 |
| 1,125,900 | 1/1915 | Darling | 422/186.07 |
| 1,856,544 | 5/1932 | Evans | 422/186.07 |
| 1,875,671 | 9/1932 | Sola | 204/313 |
| 3,309,304 | 3/1967 | Caplan | 204/313 |
| 3,457,160 | 7/1969 | Fortier | 422/186.07 |
| 3,607,709 | 9/1971 | Rice | 204/317 |
| 3,838,290 | 9/1974 | Crooks | 250/532 |
| 3,865,733 | 2/1975 | Taylor | 250/532 |
| 4,349,511 | 9/1982 | Owen | 422/186.07 |
| 4,909,996 | 3/1990 | Uys | 422/186.07 |
| 4,960,570 | 10/1990 | Mechtersheimer | 422/186.21 |

*Primary Examiner*—Donald P. Walsh
*Assistant Examiner*—Daniel Jenkins
*Attorney, Agent, or Firm*—Oblon, Spivak, McClelland, Maier & Neustadt

[57] ABSTRACT

An activated species-generating apparatus using a gaseous phase discharge used as an ozonizer and the like is provided. Wire electrodes 21a, 21b, which are obtained by coating surfaces of electrically conductive wires with a dielectric, are entangled and the resulting crowded electrodes 20a, 20b are combined to form a three-dimensional discharge range.

4 Claims, 11 Drawing Sheets

CLAD FINE WIRE ELECTRODE-TYPE ACTIVATED SPECIES-GENERATING APPARATUS

FIELD OF THE INVENTION

The present invention relates to an activated species-generating apparatus using a-gaseous phase discharge.

BACKGROUND OF THE INVENTION

A generation of a plasma by a gaseous phase discharge has been widely used for synthesis of various kinds of substances such as synthesis of a thin film on a solid phase surface and the like. Species, which bring about a gaseous phase reaction, such as electrons, ions and various kinds of excited species, that is activated species, are produced in a plasma generated by said gaseous phase discharge to make said gaseous phase reaction progress.

A representative practical example of said activated species-generating apparatus using a discharge includes an ozonizer synthesizing ozone and also a removal of harmful substances (nitrogen oxides and the like) and the like by said discharge generate said activated species similarly to utilize reactions brought about by the activated species.

In such activated species-generating apparatus, it is important how efficiently electrons are brought into collision with molecules in a gaseous please during the gaseous phase discharge, that is, how efficiently electron energies are utilized for turning said molecules into the activated species during said collision. Consequently, has been well known that in said practical ozonizer a metal-metal discharge is not carried out but a dielectric layer is disposed between metals to disperse the discharge in a space, micronizing the discharge.

in addition, in order to control said electron energies generated, also an activated species-generating apparatus, in which metallic wires are crowded in for example a netted shape to form an electrode, has been disclosed in Japanese Patent Publication No. Sho 61-32242. A typical construction of this apparatus in the case where it is used as the ozonizer is shown in FIG. 10.

A three-dimensionally crowded electrode 92, in which metallic wires are entangledly crowded, is inserted into the side of an inner surface of a cylindrical dielectric 91. A surface electrode 93 formed of a metallic layer is clad as an electrode forming a counterpart to said crowded electrode 92 on a circumferential surface of said dielectric 91. And, a material gas, such as air and oxygen, is passed through an inside of the dielectric 91 and a voltage is applied between the crowded electrode 92 and said surface electrode 93 through a power-supplying rod 94 inserted into an axis shaft line portion within the dielectric 91 to generate a corona discharge between the dielectric 91 and the crowded electrode 92, thereby ozonizing said material gas (refer to OZONE SCIENCE & ENGINEERING., 10, pp. 137–151).

Such activated species-generating apparatus is characterized in that a starting voltage of said corona discharge can be controlled over a wide range by regulating a diameter, bulk density and the like of wires in the crowded electrode. As a result, in the ozonizer, a remarkably high ozone-generating efficiency can be obtained within a low discharge voltage range close to a discharge-starting voltage. Furthermore, since a sectional shape of a gaseous flow can be freely set, a pressure loss for said gaseous flow is remarkably reduced as compared with that in a discharge space in which a dielectric is disposed between a flat plate-type electrode and a cylinder-type electrode in a usual ozonizer. Besides, it: has been confirmed that the above described activated species-generating apparatus also exhibits the same effects as in the usual ozonizer also in other respects.

However, on the other hand, a disadvantage occurs in that a discharge range is limited by a two-dimensional range along a surface of the dielectric. Accordingly, it, is difficult to say that a gain of the crowded electrode consisting of a three-dimensional mass of metallic wires is sufficiently utilized.

It is an object of the present invention to provide a highly efficient clad fine wire electrode-type activated species-generating apparatus in which a discharge range is not limited by a flat and narrow range brought into contact with a dielectric but developed all over the range where fine wires exist.

SUMMARY OF THE INVENTION

A clad fine wire electrode-type activated species-generating apparatus according to the present invention is characterized in that wire electrodes, which are obtained by coating surfaces of electrically conductive wires with a dielectric, are crowded and a plurality of the resulting crowded electrodes are combined to form a discharge range developed three-dimensionally.

The crowded electrodes may be three-dimensional or flat. Also in the case where the crowded electrodes are flat, a wide discharge range developing three-dimensionally is formed by combining them.

In addition, said wire electrodes in the crowded electrodes may be crowded irregularly or regularly.

The wire electrodes in an assembly of crowded electrodes may be tangled with each other and the crowded electrodes may be arranged at appointed intervals.

Assembly of the crowded electrodes, in which the wire electrodes are entangled with each other, includes example a mass of the wire electrodes having no regularity in which at least two pieces of wire electrode different in polarity are entangled with each other.

Nonmetallic wires, such as electrically conductive carbon fibers, may be used as said electrically conductive wires composing the wire electrodes but in general metallic wires are used. A material of said metallic wires is not specially limited. At, Au, Pd, Fe, Al, Cu, alloys such as stainless steels, and the like can be suitably used. A diameter of the wires of 0.01 to 1.0 mm is usually selected.

The dielectric coated on said surfaces of the electrically conductive wires may be made of organic substances or inorganic substances. Said organic substances include polyester, polyurethane, polyamide and the like and said inorganic substances include ceramics, such as $Al_2O_3$, glass, enamel, $SiO_2$ and the like. A thickness of the dielectric is usually selected within a range of 1 to 1,000 $\mu m$.

In said clad fine wire electrode-type activated species-generating apparatus according to the present invention, the surfaces of the electrically conductive wires composing the crowded electrodes are coated with the dielectric, so that the discharge range is widely developed all over the space where the crowded electrodes are combined. Accordingly, an activated species-generating efficiency can be improved.

The diameter of the wires in the wire electrodes and a bulk density of the wire electrodes in the crowded electrode or the assembly thereof are suitably selected so that a discharge energy may be controlled to obtain a superior activated species-generating efficiency.

In the clad fine wire electrode-type activated species-generating apparatus according to the present invention, the surfaces of the electrically conductive wires composing the crowded electrodes are coated with the dielectric, so that the discharge becomes possible overall the space where the crowded electrodes are combined. Accordingly, a share of the discharge range in a gas-passage can be remarkably increased and thus the activated species-generating efficiency can be improved.

The discharge in an optional spatial shape becomes possible without being limited by the conventional discharge construction such as the cylinder-type and the flat plate-type. Also a cylinder-type dielectric and a fiat plate-type dielectric are not required.

A severe control in size as in the conventional discharge construction is not required and thus the fabrication can be inexpensively and easily achieved.

In tile case where tile assembly of the crowded electrodes is tile mass of wire electrodes having no regularity in which at least two pieces of wire electrode different in polarity are entangled with each other, the fabrication can be in particular inexpensively and easily achieved.

In addition, not only the discharge voltage can be controlled by regulating the diameter and the bulk density of wires but also the power source can be small-sized by reducing tile discharge-starting voltage regardless of the construction of the crowded electrodes. Furthermore, electrons having an excessive energy are not brought into collision with the dielectric by reducing the voltage, whereby a heating value is reduced. Accordingly, also a useful life time of the dielectric is prolonged and a reliability of the apparatus is improved. Besides, the pressure loss for the gaseous flow is still more reduced and a compressor and the like can be saved in energy.

DESCRIPTION OF THE PREFERRED EMBODIMENTS

The discharging constructions in the clad fine wire electrode-type activated species-generating apparatus according to the present invention will be below described with reference to the drawings.

Figure 1:
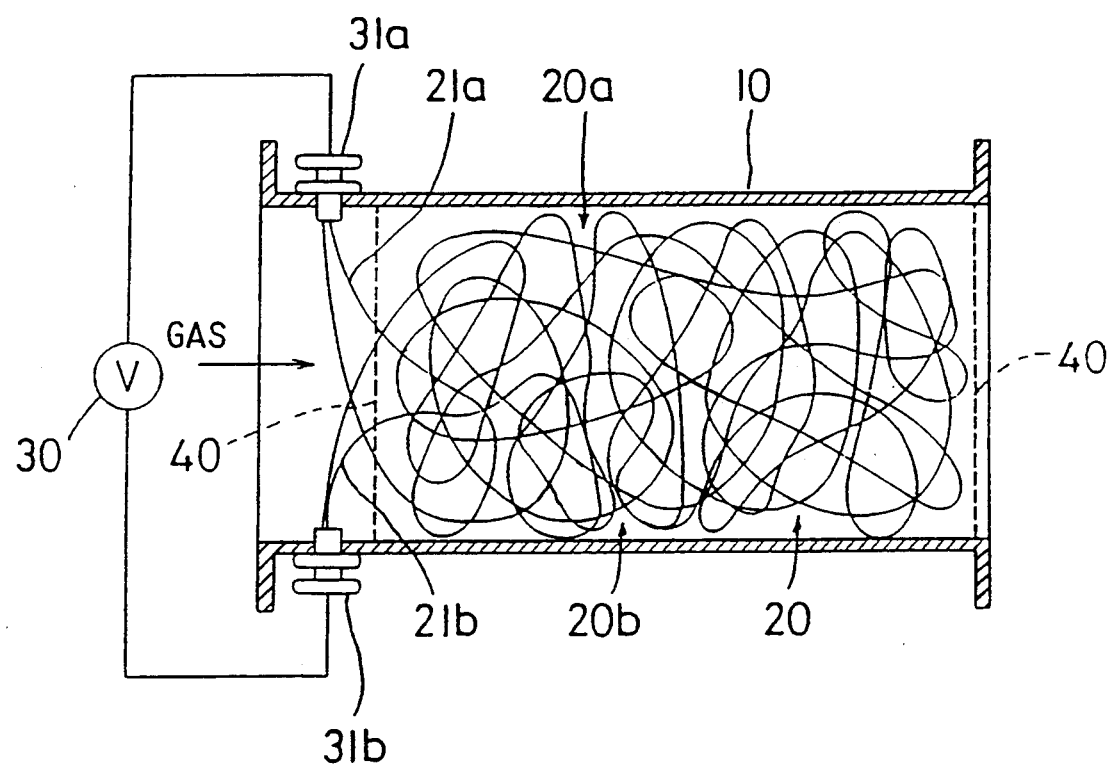
FIGS. 1 to 10 are diagrams showing constructions of electrodes in a clad fine wire electrode-type activated species-generating apparatus according to the present invention.

In a first discharging construction shown in FIG. 1, wire electrodes 21a, 21b are housed in an outer cylinder 10 having heat resistance and corrosion resistance under the condition that they are irregularly entangled with each other.

The wire electrodes 21a form one crowded electrode 20a which is connected with one pole 31a of a power source 30 at both ends thereof. Wire electrodes 21b form the other crowded electrode 20b which is connected with the other pole 31b of said power source 30 at both ends thereof. And, both the wire electrodes 21a and the wire electrodes 21b are constructed such that surfaces of electrically conductive wires are coated with a dielectric.

In addition, reference numeral 40 designates a mesh stopper mounted on both end portions of said outer cylinder 10.

A discharge can be generated all over the space within the outer cylinder 10, in which the wire electrodes 21a, 21b are housed, by applying an appointed voltage between the wire electrodes 21a and the wire electrodes 21b from the power source 30 under the condition that a gas is flown through said inside of the outer cylinder 10. Accordingly, said gas all passes through a discharging range.

In the case where an assembly 20 of said crowded electrodes 20a, 20h is formed of masses of the wire electrodes 21a, 21b, as in said discharging construction shown in FIG. 1, a bulk density of said masses determines a mean length of voids.

Figure 2:
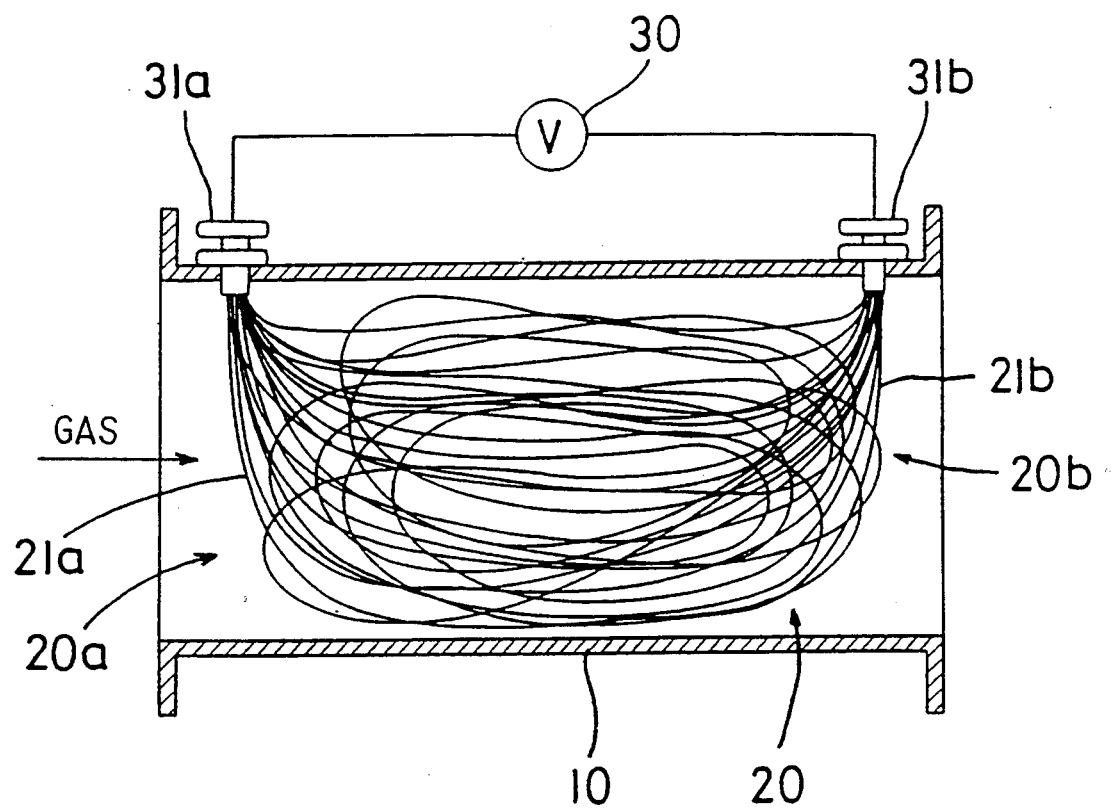

In said discharging construction shown in FIG. 2, the respective bundles of the wire electrodes 21a, 21b bundled in a U-letter shape and connected with the respective poles 31a, 31b of the power source 30 at both ends thereof are inserted into the outer cylinder 10 from both ends of the outer cylinder 10 so as to be entangled with each other in a central portion of the outer cylinder 10. Also in this discharging construction, the whole space, in which the crowded electrodes 20a, 20b are combined, becomes the discharging range.

Figure 3:
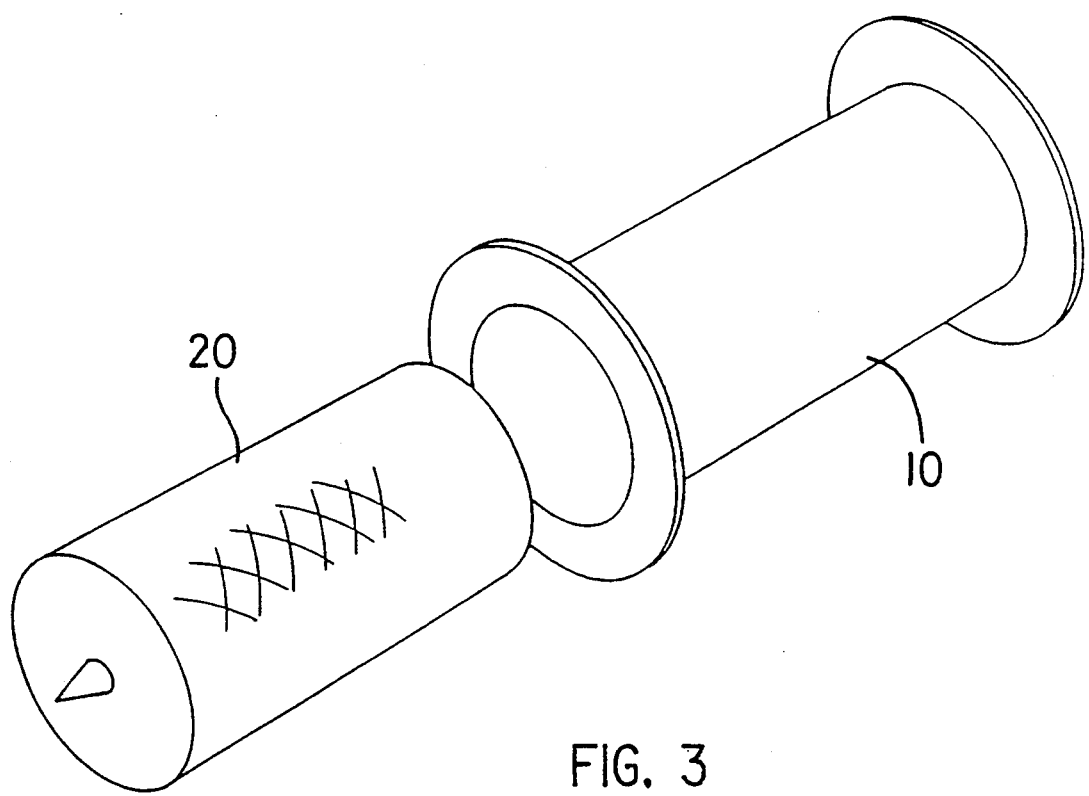

Said assembly 20 of the crowded electrodes 20a, 20b may be a cartridge-type one detachable from the outer cylinder 10, as shown in FIG. 3.

Figure 4:
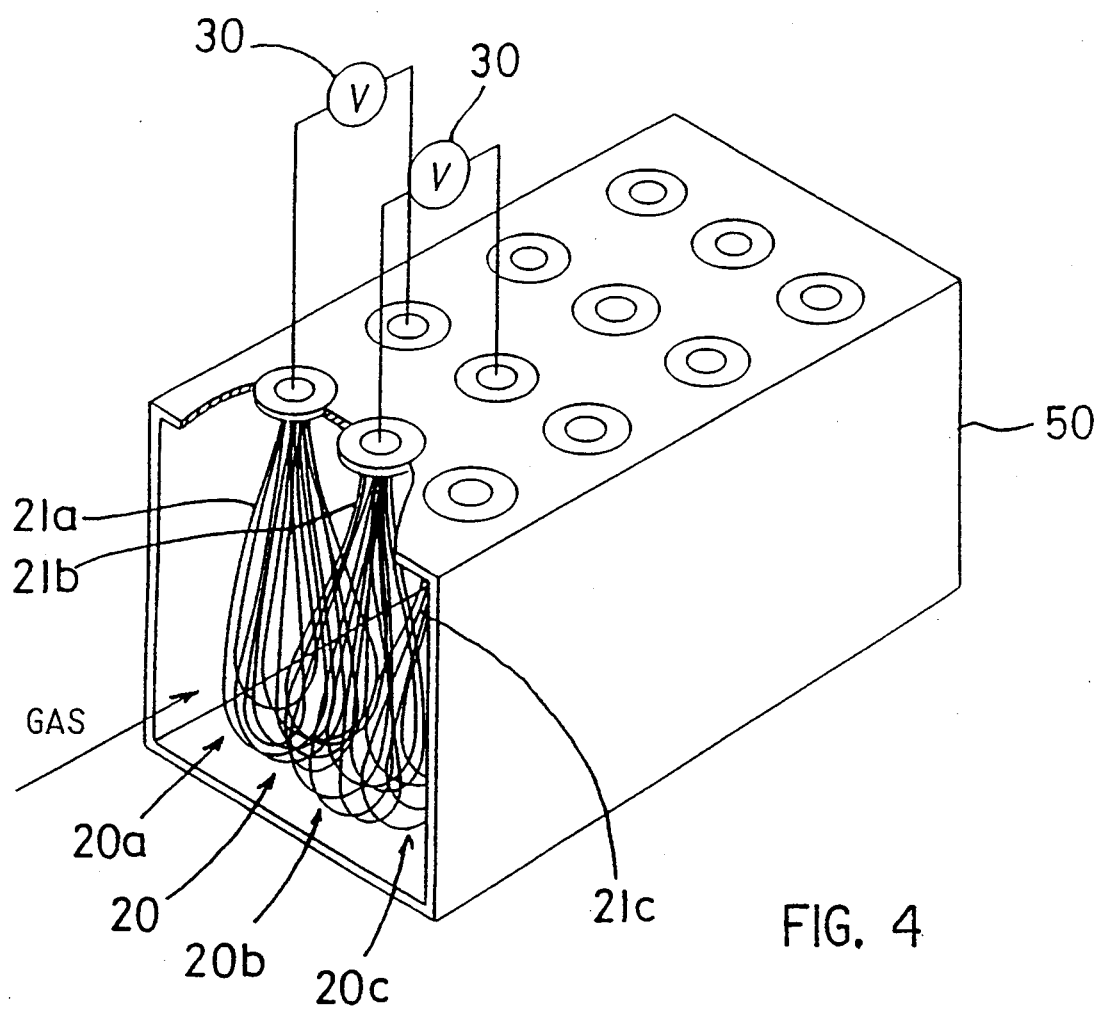

In addition, also said discharging construction, in which the crowded electrodes 20a, 20b - - - composed of the wire electrodes 21a, 21b - - - bundled in a U-letter shape, respectively, are inserted into a duct 50 almost vertically to the direction of the gaseous flow, as shown in FIG. 4 may be applied.

Although the wire electrodes are irregularly crowded in the above described examples of the crowded electrode, the wire electrodes may be regualrly crowded in the crowded electrode, as shown in FIGS. 5 to 9.

Figure 5:
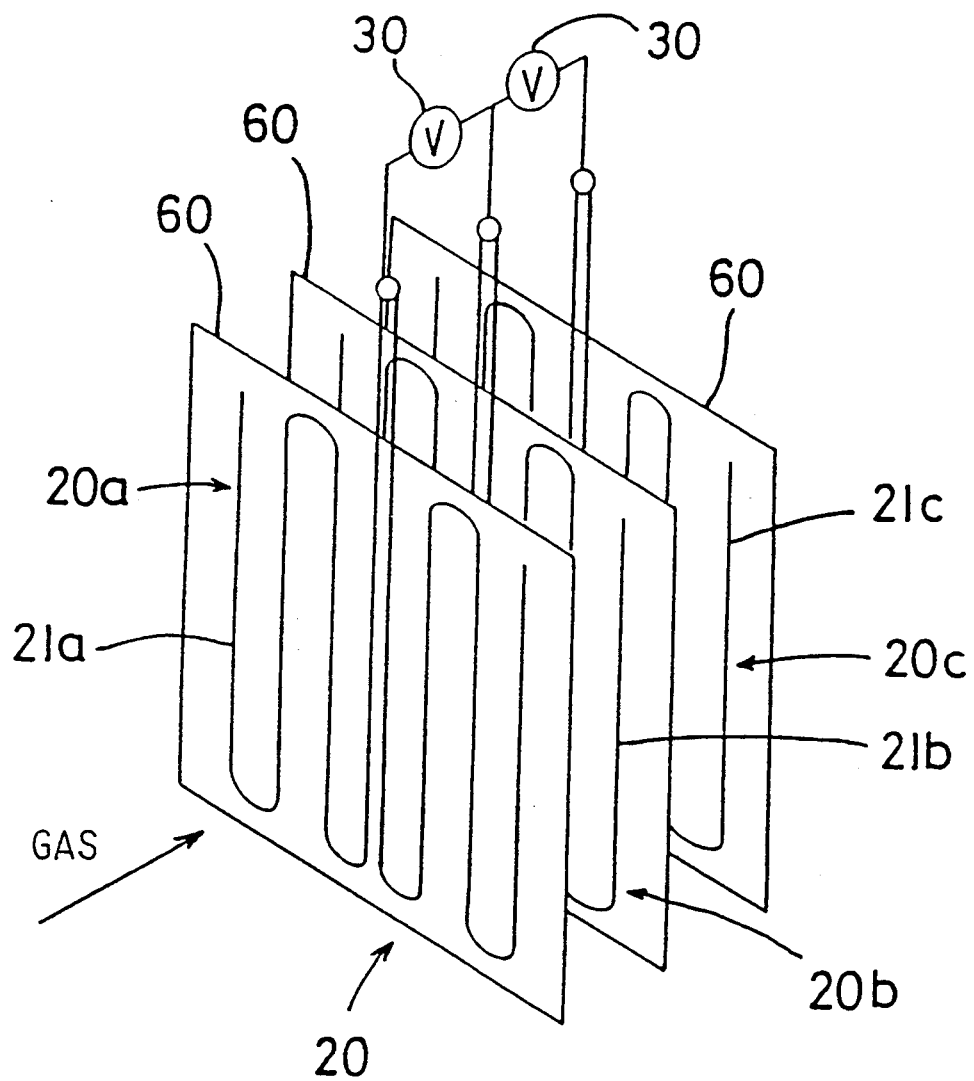

In an electrode construction shown in FIG. 5, the wire electrodes 21a, 21b - - - meander in parallel to each other at appointed intervals to form the flat crowded electrodes 20a, 20b - - - the crowded electrodes 20a, 20b - - - are mounted on support plates 60, permeable to air, respectively, and arranged at said appointed intervals in the direction of the gaseous flow.

Figure 6:
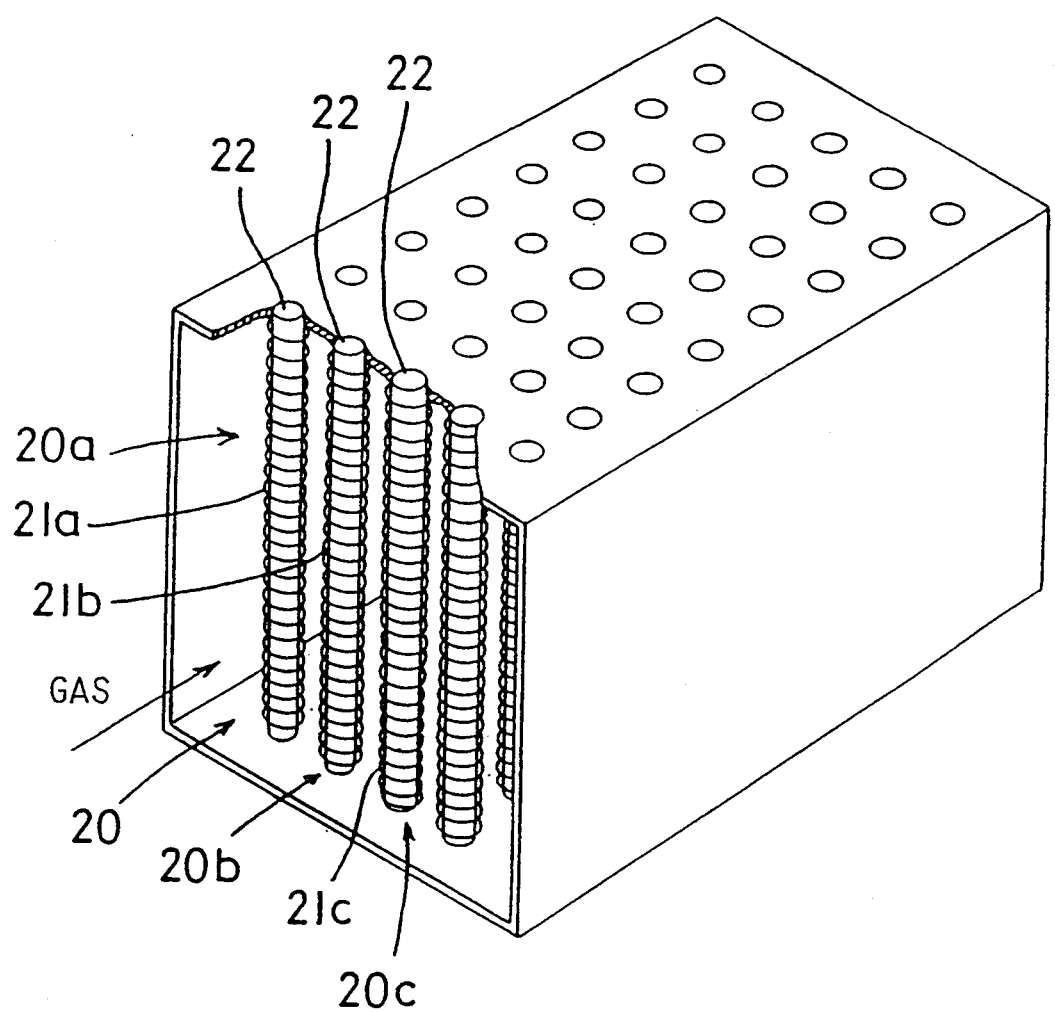

In an electrode construction shown in FIG. 6, the wire electrodes 21a, 21b - - - are coiled up around support rods 22, 22 - - - to Form three-dimensional crowded electrodes 20a, 20b - - - . In the case where a diameter of the wire electrodes is large, it is natural that the wire electrodes 21a, 21b - - - may be coiled up around said support rods 22, 22 - - - followed by pulling out the support rods 22, 22 - - - . In addition, in the case where ozone is generated by the use of said electrode construction shown in FIG. 6, it is sufficient that a plurality of fine rods are circularly arranged as said support rods 22, 22 - - - . On the contrary, in the case wherein a particular discharge along a surface is to be generated, it is sufficient that two pieces of fine wire composing positive and negative poles are alternately wound around one piece of tubular or solid support rod to form an electrode.

Figure 7:
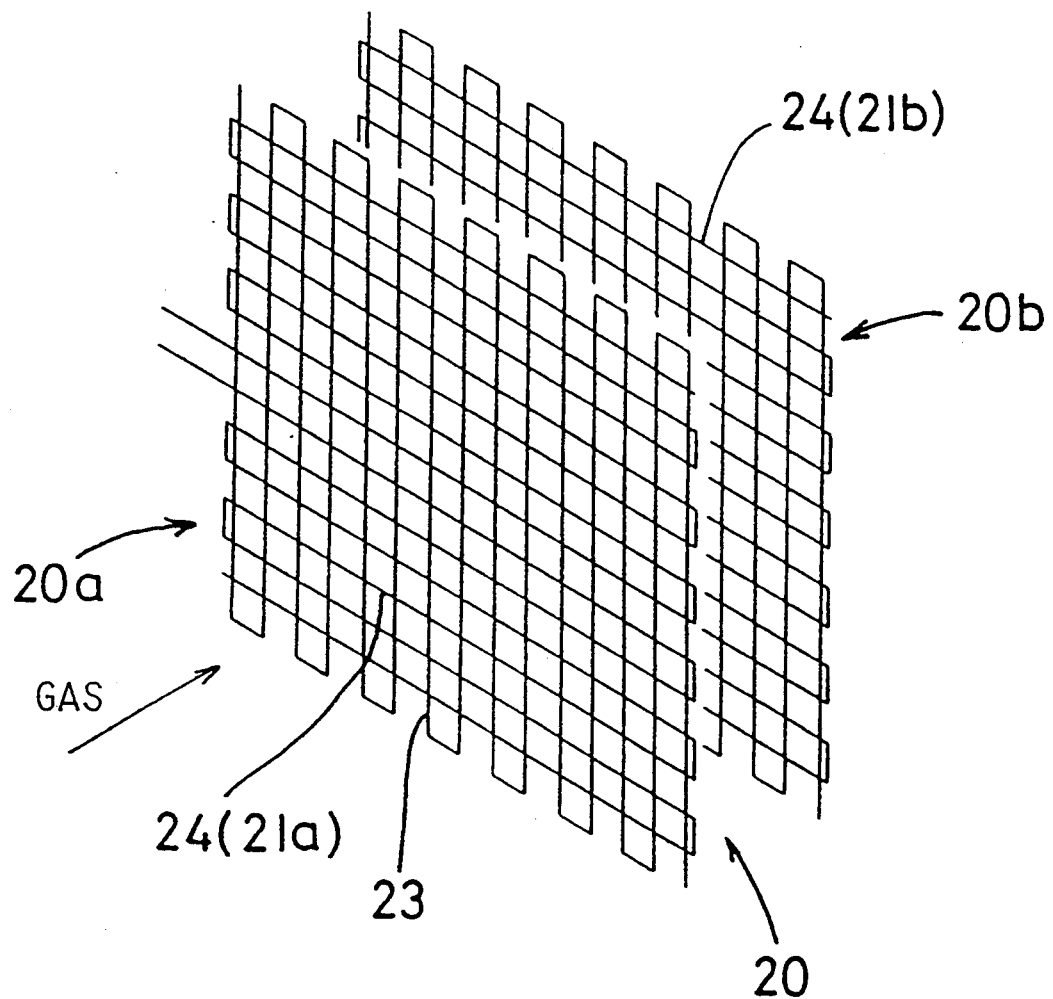
Figure 8:
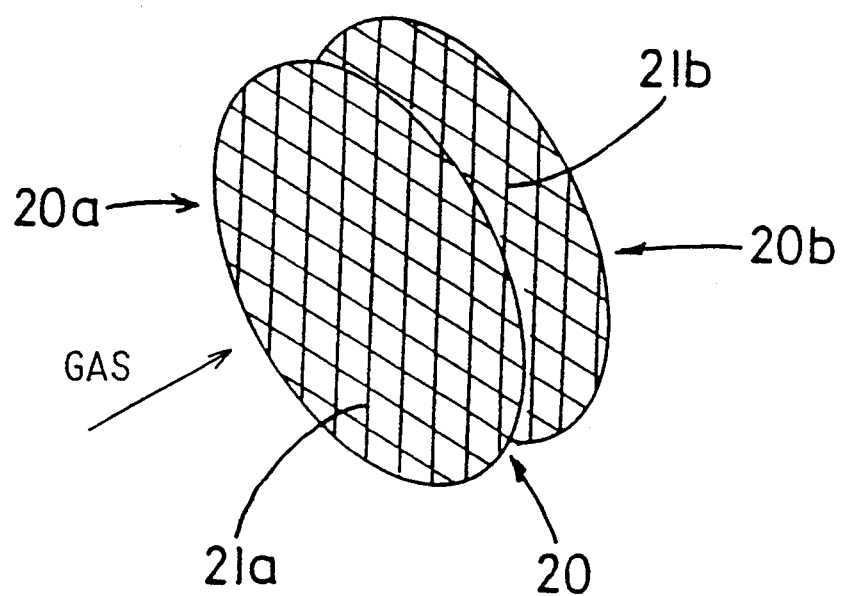

In an electrode construction shown in FIG. 7, longitudinal wires 23 made of heat resistant, corrosion resistant and insulating glass fiber and the like are used as supports and lateral wires 24 formed of a wire electrode are entangled with said longitudinal wires 23 to form netted crowded electrodes 20a, 20b - - - . Although crowded electrodes 20a, 20b shown in FIG. 8 are netted, they are different from said crowded electrodes 20a, 20b shown in FIG. 7 in that a metallic net is directly coated with a dielectric to form all of net wires as wire electrodes 21a, 21b.

Figure 9:
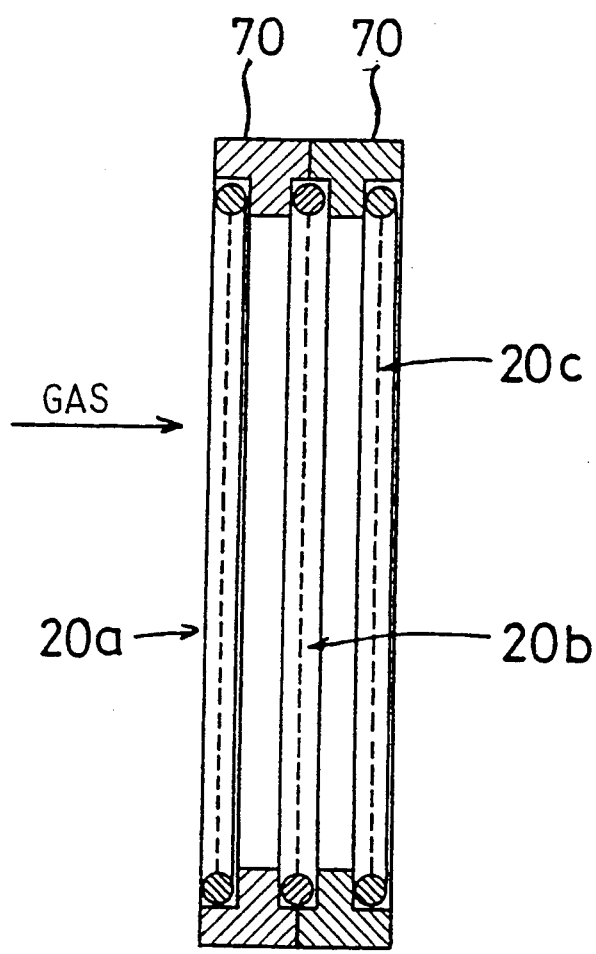
Figure 10:
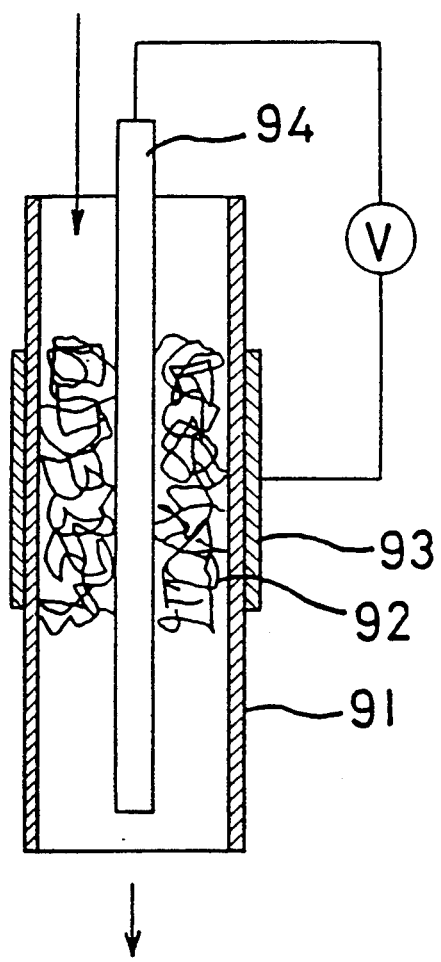

Said crowded electrodes 20a, 20b can be arranged at appointed intervals in the direction of the gaseous flow by the use of circular spacers 70, as shown in for example FIG. 9.

Although the wire electrodes 21a, 21b - - - in the crowded electrodes 20a, 20b - - - are not entangled with each other in the electrode constructions shown in FIGS. 5 to 9, gaps between the discharges can be set at appointed values by arranging the crowded electrodes 20a, 20b - - - at appointed intervals to control the discharge energy, thereby using the whole space, in which the crowded electrodes 20a, 20b are arranged, as the discharge range.

The following results were obtained when ozone was practically generated by means of the clad fine wire electrode-type activated species-generating apparatus according go the present invention.

Figure 11:
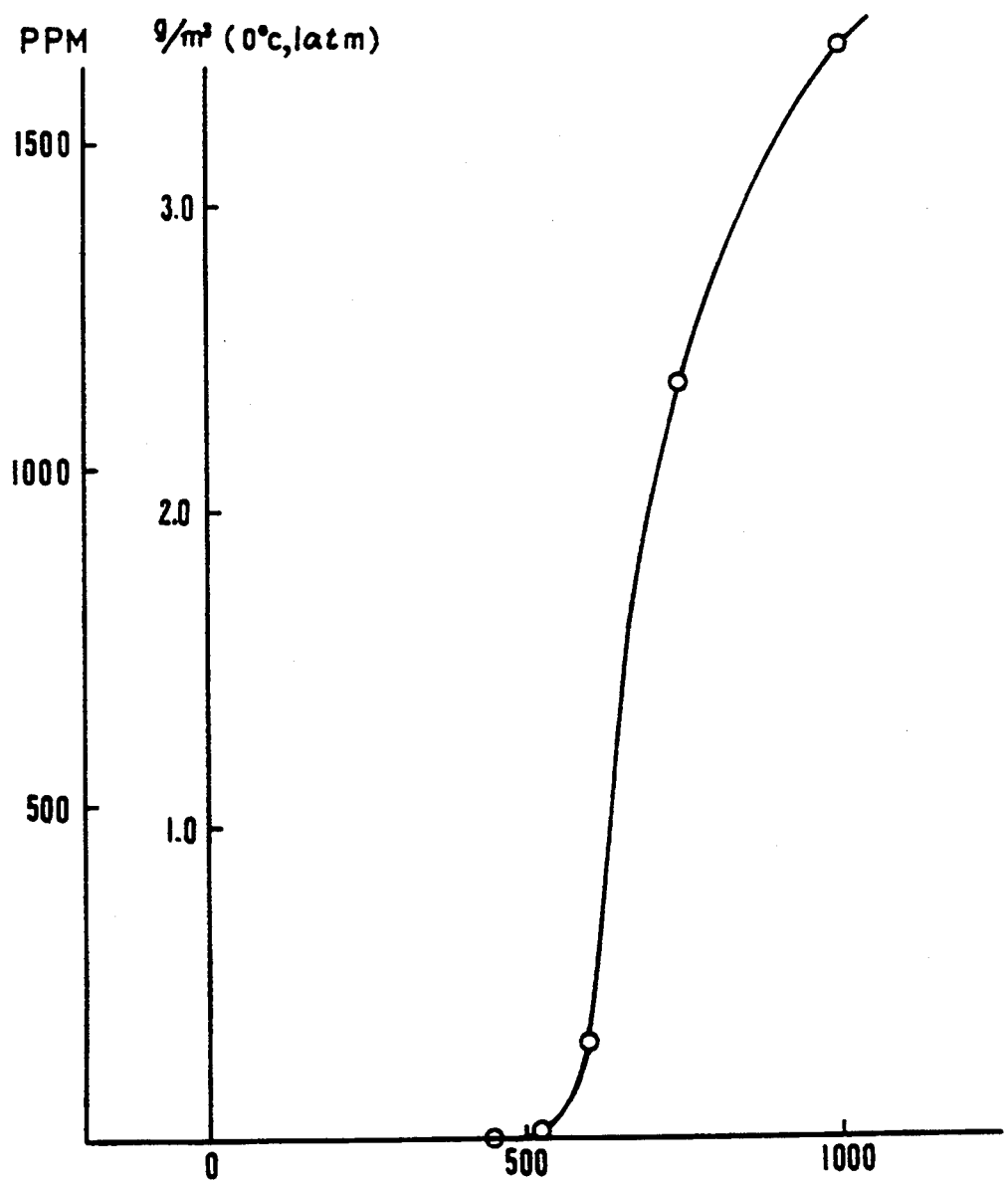
FIG. 11 is a graph showing a relation between a discharge voltage and a concentration of ozone in the case where said clad fine wire electrode-type activated species-generating apparatus according to the present invention is used as an ozonizer.

The crowded electrodes were constructed by dividing scores of enameled fine wires having a diameter of 0.04 mm coated with silicon rubber of 0.04 mm thick and the total length of 270 mm into two groups and inserted into a pyrex glass Lube (outside diameter of 42 mm × thickness of 1.6 mm × length of 300 mm) from both ends of said pyrex glass tube to be entangled with each other in a central portion of the pyrex glass tube. A relation between a concentration of ozone in an ozonized gas generated and a discharge voltage when said discharge voltage (60 Hz) was applied to the crowded electrodes and an $O_2$ gas was flown through an inside of the pyrex glass tube is shown in FIG. 11. As obvious from FIG. 11, the discharge-starting voltage of several kV, which had been generally required, could be reduced to merely 500 V and said ozonized gas containing $O_3$ in a quantity of 2.4 and 3.5 g/5 m$^3$ (0° C. 1 atm) was obtained at the discharge voltage of 750 V and 1.005 V, respectively.

As above described, the clad fine wire electrode-type activated species-generating apparatus according to the present invention is useful as not only an ozonizer but also apparatus for removing harmful components from various kinds of exhaust gas.

Obviously, numerous modifications and variations of the present invention are possible in light of the above teachings. It is therefore to be understood that within the scope of the appended claims, the invention may be practiced otherwise than as specifically described herein.

What is claimed is:

1. A clad wire electrode-type activated species-generating apparatus, comprising:
 a housing defining an enclosed space; and
 a plurality of wire electrodes randomly entangled among one another within said space to thereby form a discharge region, wherein each of said plurality of wire electrodes is formed of an electrically conductive wire coated with dielectric material and is connected to a voltage supply source, and wherein said plurality of wire electrodes serve as the sole electrodes of said apparatus.

2. A clad wire electrode-type activated species-generating apparatus according to claim 1, wherein said plurality of wire electrodes are entangled to form a flat plane of wire electrodes or a three-dimensional bunch of wire electrodes.

3. A clad wire electrode-type activated species-generating apparatus according to claim 1, wherein said plurality of wire electrodes are arranged at predetermined intervals within said enclosed space of said housing.

4. A clad wire electrode-type activated species-generating apparatus according to claim 1, wherein said plurality of wire electrodes are entangled among one another randomly and comprise at least two wire electrodes having different polarities entangled with one another.

* * * * *